(12) United States Patent
Good (10) Patent No.: US 11,748,951 B1
(45) Date of Patent: Sep. 5, 2023

(54) SYSTEMS AND METHODS FOR SELECTIVELY EDITING ATTRIBUTES IN A THREE- DIMENSIONAL SPACE

(71) Applicant: Illuscio, Inc., Culver City, CA (US)

(72) Inventor: Max Good, Los Angeles, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/181,134

(22) Filed: Mar. 9, 2023

Related U.S. Application Data (63) Continuation-in-part of application No. 18/047,387, filed on Oct. 18, 2022, which is a continuation of application No. 17/743,582, filed on May 13, 2022, now Pat. No. 11,488,360.

(51) Int. Cl.
*G06T 19/00* (2011.01)

(52) U.S. Cl.
CPC .......... *G06T 19/00* (2013.01); *G06T 2200/24* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 10,893,299 B2 * | 1/2021 | Boyce | G06T 7/557 |
| 2018/0350044 A1 * | 12/2018 | Ponto | G06T 15/00 |
| 2020/0209009 A1 * | 7/2020 | Zhang | G01C 21/3841 |
| 2020/0361083 A1 * | 11/2020 | Mousavian | B25J 9/1612 |
| 2021/0319593 A1 * | 10/2021 | Flynn | H03M 7/6029 |
| 2022/0319675 A1 * | 10/2022 | Mork | G06N 3/0464 |
| 2022/0334644 A1 * | 10/2022 | Yokoyama | G06F 3/0488 |

* cited by examiner

*Primary Examiner* — Saptarshi Mazumder
(74) *Attorney, Agent, or Firm* — Ansari Katiraei LLP; Arman Katiraei; Sadiq Ansari (57) ABSTRACT

Disclosed is an editing system that accounts for or leverages the three-dimensional ("3D") positioning of 3D image data to edit attributes of a selected first set of image data based on attributes of an unselected second set of image data that is determined to be a threshold distance from the first set of image data and on the same surface as the first set of image data. The system leverages x, y, and z coordinates as well as surface normals to exclude image data from the editing that is within the threshold distance but that forms part of a different object, surface, or side about an edge of a surface than the first set of image data. The system also modifies the attribute adjustment based on the distance separating the first set of image data from a render position or each instance of the second set of image data.

20 Claims, 8 Drawing Sheets

SYSTEMS AND METHODS FOR SELECTIVELY EDITING ATTRIBUTES IN A THREE- DIMENSIONAL SPACE

CLAIM OF BENEFIT TO RELATED APPLICATIONS

This application is a continuation-in-part of U.S. nonprovisional application Ser. No. 18/047,387 entitled "Systems and Methods for Editing Three-Dimensional Data and Point Clouds", filed Oct. 18, 2022 which is a continuation of U.S. nonprovisional application Ser. No. 17/743,582 entitled "Systems and Methods for Editing Three-Dimensional Data and Point Clouds", filed May 13, 2022 and issued as U.S. Pat. No. 11,488,360. The contents of application Ser. Nos. 18/047,387 and 17/743,582 are hereby incorporated by reference.

BACKGROUND

Two-dimensional ("2D") image editing applications include tools for blending, smudging, and/or other adjusting of 2D pixel attributes. For instance, a blending tool mixes colors of a selected set of pixels with colors of surrounding pixels. Applying these same 2D editing tools to image data that is distributed in a three-dimensional ("3D") space produces undesired or inaccurate results. Specifically, the 2D editing tools do not account for the depth or 3D positioning of the image data such that the color of first image data at a particular x, y, and z position may be blended with the color of second image data that neighbors the first image data in the x and y planes but that is separated by a large depth in the z plane. In other words, the first image data may represent a point in the foreground, and the 2D editing tool may blend the colors of the point in the foreground with an unrelated and entirely different point in the background.

DETAILED DESCRIPTION OF PREFERRED EMBODIMENTS

The following detailed description refers to the accompanying drawings. The same reference numbers in different drawings may identify the same or similar elements.

Provided are systems and methods for selectively editing attributes of image data that is distributed in a three-dimensional ("3D") space. The systems and methods provide editing tools for correctly and accurately blending, smudging, and/or otherwise adjusting attributes of a first set of 3D image data based on attributes of surrounding second set of 3D image data that form part of the same surface or object as first set of 3D image data as determined by accounting for the 3D positioning of the first and second sets of 3D image data. In other words, rather than blend the color values of a selected point in 3D space based on the average of the color values of all points that surround the selected point in the x and y planes, a 3D editing system selectively adjusts the color values of the selected point based on the distance between the selected point and the surrounding points in the x, y, and z planes. Consequently, the 3D editing system provides a 3D blending tool that blends or smudges colors for image data belonging to the same continuous surface or object while excluding colors of background image data and/or colors of other surfaces or objects that neighbor the selection of the image data or the activation of the 3D blending tool in 2 of 3 planes (e.g., the x and y planes but not the z plane).

Figure 1:
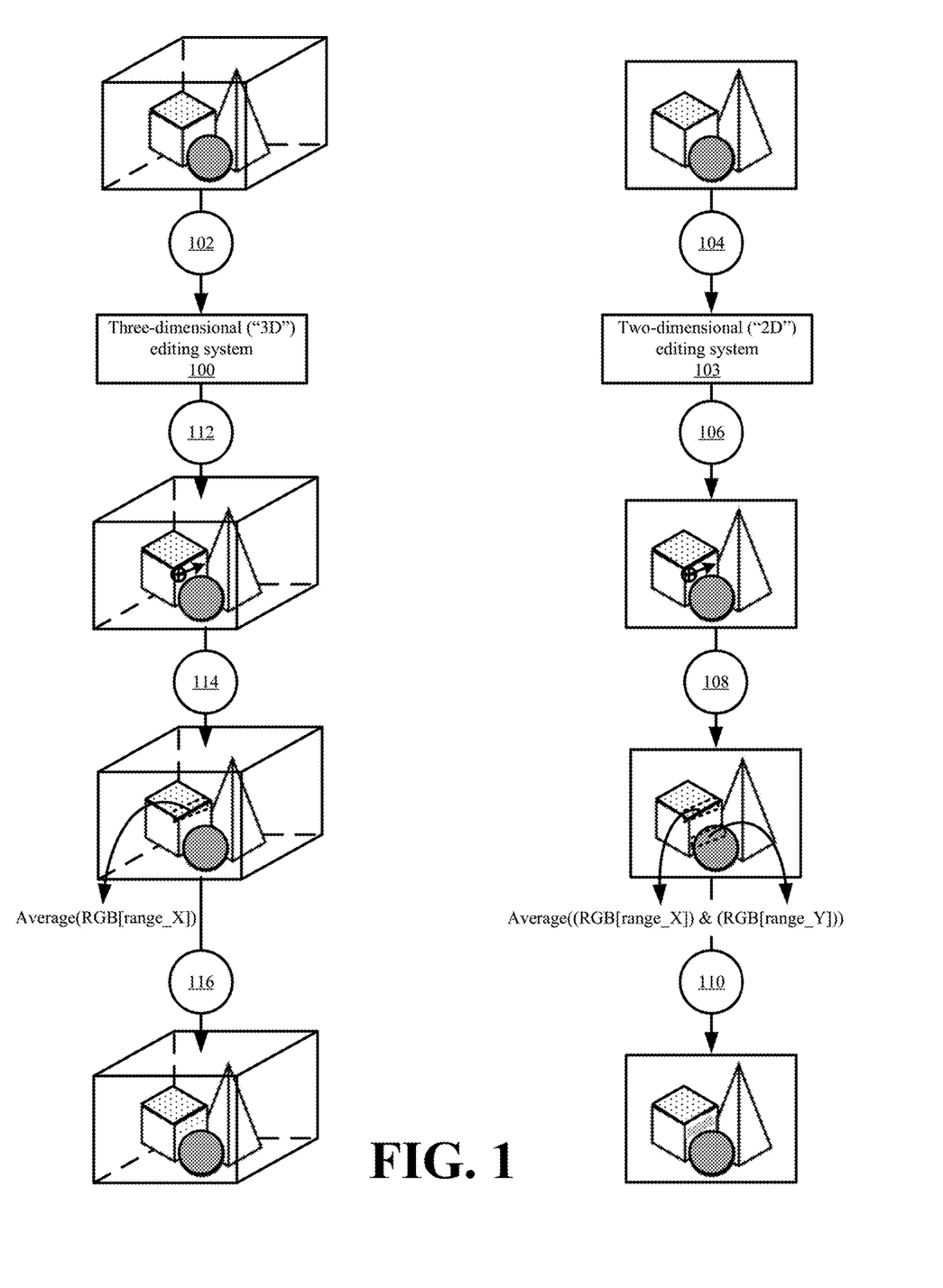
FIG. 1 illustrates example operation of a two-dimensional ("2D") blending tool and a three-dimensional ("3D") blending tool in accordance with some embodiments presented herein.

FIG. 1 illustrates example operation of a two-dimensional ("2D") blending tool and a 3D blending tool of the 3D editing system in accordance with some embodiments presented herein. As shown, 3D image editing system 100 receives (at 102) a 3D image of one or more objects or a scene, and 2D editing system 103 receives (at 104) a 2D image of the same one or more objects or scene but in a 2D format.

The 3D image corresponds to a point cloud or a 3D model of the objects or scene that is constructed with a set of meshes, polygons, or other 3D constructs. The 3D image data includes the point cloud points or the 3D model meshes, polygons, or other 3D constructs.

The 3D image data is non-uniformly defined or distributed across a virtual 3D space, whereas the pixels of the 2D image have a uniform density or fixed arrangement that is defined by the resolution of the 2D image. More specifically, the points of a point cloud or meshes of a 3D model (e.g., the 3D image data) differ from pixels of a 2D image, because certain regions of the point cloud or 3D model have no points or meshes, lower densities of points or meshes, and/or higher densities of points or meshes based on varying amounts of visual information that is detected, scanned, or created at those regions. Additionally, the positions of the 3D image data are defined in a 3D space using x, y, and z coordinate values. In contrast, pixels of a 2D image are defined with x and y coordinate values and no depth or z coordinate values.

The positional elements of the 3D image data may also include a surface normal. The surface normal defines the angle, direction, or orientation that the surface, feature, or object represented by the 3D image data faces or is exposed to. More specifically, the surface normal is a line, ray, or vector that is perpendicular to the surface, feature, or object represented by the 3D image data.

The non-positional elements of the 3D image data include information about the detected characteristics of the surface, feature, or object at a corresponding position in the scene. The characteristics may correspond to a detected color. The color may be represented using red, green, blue ("RGB"), and/or other values. In some embodiments, the 3D image data may have multiple sets of non-positional elements with each set of non-positional elements storing intensity values or other hyperspectral values detected across a different band of the electromagnetic spectrum. For instance, a first set of non-positional elements may store values measured in the 800 to 2,500 nanometer wavelengths for near-infrared light, and a second set of non-positional elements may store values measured in the 10 to 400 nanometer wavelengths for ultraviolet light from the position of the real-world object identified by the associated positional elements of the data point.

In some embodiments, the non-positional elements store other characteristics for the represented surface, feature, or object including the hardness, softness, elasticity, texture (e.g., roughness or smoothness), spring force, stickiness, and/or material property. For instance, a first data point may be defined with a non-positional element with a value that identifies the material property of "aluminum", a second data point may be defined with a non-positional element with a value that identifies the material property of "steel", and a third data point may be defined with a non-positional element with a value that identifies the material property of "plastic". Each of the non-positional elements may have a different effect on an adjustment that is performed using the 3D editing tools of 3D editing system 100.

2D editing system 103 provides a 2D color blending tool that a user activates and applies (at 106) to a first set of pixels. The 2D color blending tool analyzes the color values of the pixels that surround the first set of pixels in the x and y planes. The surrounding pixels include a second set of pixels from the same first object formed by the first set of pixels, and a third set of pixels of a different second object that is positioned in front of the first object. In this 2D context, the second object cannot be positionally differentiated from the first object because of the lack of depth or z-coordinate data.

Accordingly, 2D editing system 103 defines (at 108) the 2D color blending tool adjustment based on the average of the color values for the second set of pixels and the third set of pixels that surround the selected first set of pixels. 2D editing system 103 applies (at 110) the 2D color blending tool adjustment to the first set of pixels, thereby changing the color values of the first set of pixels of the first object with the blended color values of the third set of pixels from the entirely different second object. Consequently, 2D editing system 103 creates an inaccurate or undesired blending of color values from two different objects when the 2D color blending tool is activated only on the first set of pixels of the first object.

3D editing system 100 provides a 3D color blending tool that a user activates and applies (at 112) to a first set of 3D image data. 3D editing system 100 analyzes the positions of the first set of 3D image data, and selects (at 114) surrounding 3D image data for blending that is a threshold distance away from the positions of the first set of 3D image data. In selecting (at 114) the surrounding 3D image data, 3D editing system 100 excludes 3D image data that neighbors the first set of 3D image data on the x and y planes but that is located on a distant z plane. Specifically, 3D editing system 100 excludes the 3D image data that is part of the background or a different surface or object than the first set of 3D image data based on the positional analysis, and selects (at 114) a second set of 3D image data that is part of the same surface or object as the first set of 3D image data. 3D editing system 100 defines the 3D color blending tool adjustment based on the average of the color values or defined non-positional elements for the second set of 3D image. Accordingly, the 3D color blending tool adjustment does not include or reference the color values or defining non-positional elements of neighboring 3D image data that belongs to a different surface or object as determined based on the difference in the depth or z-positional coordinates of the 3D image data.

3D editing system 100 applies (at 116) the 3D color blending tool adjustment to the first set of 3D image data, thereby changing the color values of the first set of 3D image data with the blended color values of the second set of 3D image data from the same object. 3D editing system 100 therefore produces an accurate or desired blending of color values by blending only the color values of the same surface or object rather than color values of directly neighboring 3D image data from different surfaces or objects. In other words, by accounting for the 3D positions of the 3D image data, 3D editing system 100 produces more accurate attribute adjustments (e.g., color blending) than 2D editing system 103 that simply uses the color values of the nearest pixels in the x and y planes to perform the color blending even though those pixels may be part of the image background or entirely unrelated surfaces or objects.

Figure 2:
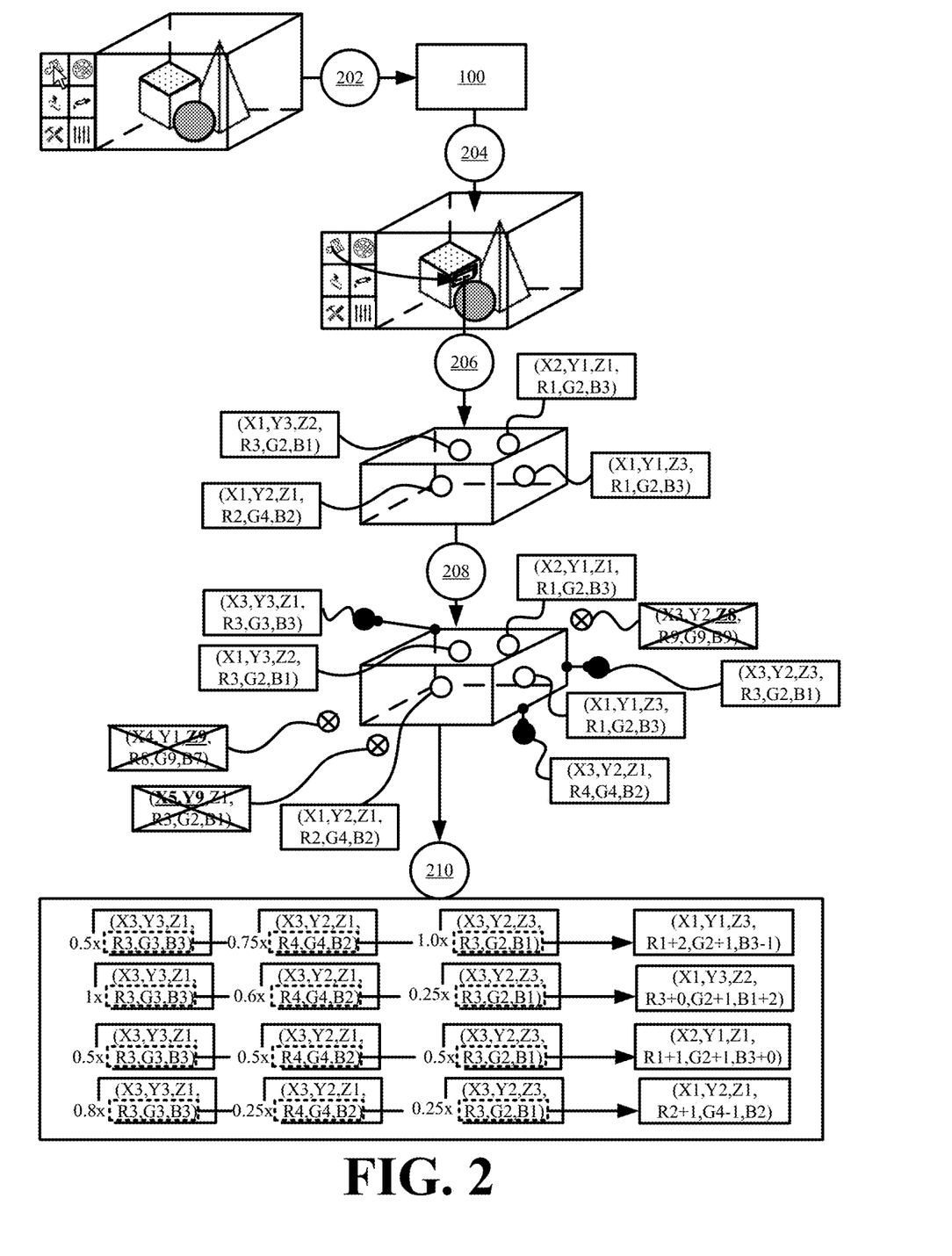
FIG. 2 illustrates an example of accurately adjusting attributes of 3D image data with attributes of neighboring 3D image data from a same surface or object by accounting for the 3D positioning of the 3D image data in accordance with some embodiments presented herein.

FIG. 2 illustrates an example of accurately adjusting attributes of 3D image data with attributes of neighboring 3D image data from a same surface or object by accounting for the 3D positioning of the 3D image data in accordance with some embodiments presented herein. 3D editing system 100 receives (at 202) input that activates a brush or other tool for adjusting attributes of 3D image data. Specifically, the input is provided over or with respect to a graphical user interface ("GUI") element for performing a 3D color blending edit.

Additional input activates (at 204) the brush over a first set of 3D image data. In some embodiments, the brush is activated to select the first set of 3D image data by drawing a border or volume around the first set of 3D image data.

3D editing system 100 retrieves (at 206) the positional elements and the non-positional elements defined for the first set of 3D image data. The positional elements define the x, y, and z position for each point cloud point or 3D model mesh in the first set of 3D image data.

3D editing system 100 selects (at 208) a second set of 3D image data that is outside the user activation of the brush and that is a threshold distance from the position of at least one point cloud point or 3D model mesh in the first set of 3D image data. 3D editing system 100 continuously adds to or changes the second set of 3D image data as the brush is moved over different 3D positions of different 3D image data in the first set of 3D image data.

3D editing system 100 computes a blending adjustment for each point cloud point or 3D model mesh in the first set of 3D image data based on the distance of the second set of 3D image data to that point cloud point or 3D model mesh. 3D editing system 100 adjusts (at 210) the color values and/or other non-positional elements of each particular point cloud point or 3D model mesh in the first set of 3D image data according to the blending adjustment that is computed for that particular point cloud point or 3D model mesh. For instance, 3D editing system 100 defines the blending adjustment to provide a greater weight or receive a larger color contribution from a first point than a second point of the second set of 3D image data when editing the color values of a particular point in the first set of 3D image data that is closer to the first point than the second point.

To further improve the accuracy of adjusting attributes of a selected first set of 3D image data based on attributes of a unselected second set of 3D image data belonging to the same surface or object as the selected first set of 3D image data, 3D editing system 100 may account for the surface normals of the first and second sets of 3D image data. Based on the surface normals, 3D editing system 100 determines whether the surrounding 3D image data (e.g., 3D image data that is a threshold distance from 3D image data selected for adjustment) is part of the same surface or object as the 3D image data being adjusted and should therefore contribute to the blending adjustment of that 3D image data. In some embodiments, 3D editing system 100 adjusts the blending contribution based on the similarity or difference in the surface normal angles.

Moreover, 3D editing system 100 uses the surface normals to differentiate between 3D image data that is on different sides of an object or surface edge. Specifically, 3D editing system 100 excludes 3D image data on a first side of an edge from contributing to the adjustment that is applied to 3D image data on a different second side of the edge despite the 3D image data being part of the surface or object, within a threshold distance of one another, and/or at similar depths in the 3D space of the 3D image.

Figure 3:
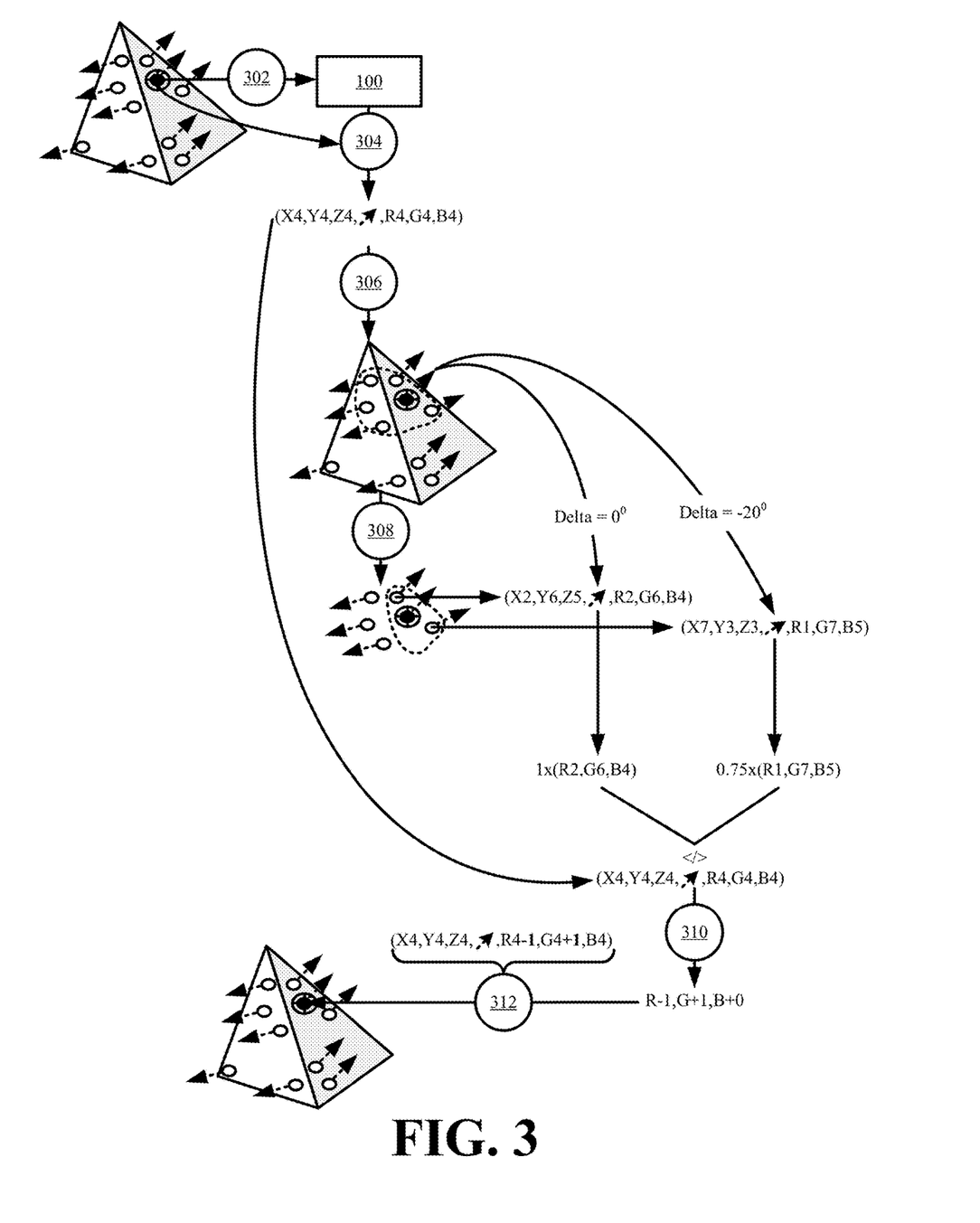
FIG. 3 illustrates an example of defining a 3D edit based in part on surface normals of 3D image data in accordance with some embodiments presented herein.

FIG. 3 illustrates an example of defining a 3D edit based in part on surface normals of 3D image data in accordance with some embodiments presented herein. 3D editing system 100 detects (at 302) activation of the 3D edit over a particular point cloud data point.

3D editing system 100 obtains (at 304) the positional and non-positional elements of the particular data point. The positional elements define the x, y, and z positional coordinates and the surface normal of the particular data point. The surface normal is defined as a vector with an angle or direction that is perpendicular to the tangent plane of the particular data point. The vector may be used to identify the exposed side of the particular data point.

3D editing system 100 selects (at 306) a set of data points that are a threshold distance from the particular data point. The set of data points are selected by computing the difference between the positional elements of the set of data points and the positional elements of the particular data points, and determining that the difference is a less than the threshold distance. The set of data points may include the data points that are within a volume that is centered on the particular data point, and/or that are within a range of planes defined from the x, y, and z positional coordinates of the particular data point. In any case, the threshold distance is defined such that the set of data points include data points that are from the same surface or object that contains the particular data point.

3D editing system 100 filters (at 308) a subset of data points from the selected (at 306) set of data points based on the surface normals. For instance, 3D editing system 100 excludes data points from the set of data points that have surface normals that have more than a 90 degree difference with the surface normal of the particular data points. The 90 degree difference indicates that a data point is on a different side of an edge or on a different surface than the particular data point. Accordingly, filtering (at 308) the subset of data points includes removing from the adjustment the data points that are the threshold distance from the particular data point but that are on a different side of an edge, a different side of a surface, or are on a different surface or object altogether than the particular data point, and retaining for the adjustment the data points that are the threshold distance from the particular data point and are on the same side of the same continuous surface as the particular data point.

3D editing system 100 computes (at 310) an adjustment to apply to the non-positional elements of the particular data point based on the non-positional elements of the subset of data points and a difference between the surface normal of the particular data point and the surface normals of the subset of data points. The adjustment is weighted more heavily towards the non-positional elements of the data points from the subset of data points with surface normals in the same direction or angle as the surface normal of the particular data point, and less heavily towards the non-positional elements of the data points from the subset of data points with surface normals that have directions or angles that shift increasingly away from the direction or angle of the particular data point surface normal. The adjustment computation may also be affected by the distance of each data point in the subset of data points from the particular data point with the closer data points contributing more significantly to the adjustment than data points that are farther from the particular data point.

3D editing system 100 modifies (at 312) the non-positional elements of the particular data point based on the computed (at 310) adjustment. For a color blending adjustment, the color values of the particular data point are changed to more closely reflect the color values of a first data point from the subset of data points with a surface normal in the same direction or angle as the surface normal of the particular data point, and to less closely reflect the color values of a second data point from the subset of data points with a surface normal having increasingly divergent directions or angles than the surface normal of the particular data point. In other words, first data point contributes more heavily to the color blending adjustment than the second data point due to the surface normal of the first data point being more aligned with the surface normal of the particular data point than the second data point.

In some embodiments, the computation of the blending, smudging, and/or other attribute adjustment is further affected by the distance between the filtered subset of the 3D image data, that contribute to the adjustment of a selected set of 3D image data, and a render position. In some such embodiments, 3D editing system 100 uses the depth values associated with the 3D positions of the 3D image data to compute the distance between the 3D image data and the render position of the camera from which the 3D image is generated, and to adjust the applied 3D edit based on the computed distances from the render position. For instance, the closer the 3D image data is to the render position, the more noticeable an adjustment will be. Accordingly, 3D editing system 100 increases the effect or change produced by a 3D edit when that 3D edit is applied to 3D image data that is closer to the render position than to 3D image data that is farther from the render position. For a 3D blending adjustment, the color values for a data point that is at a closer z-depth to the render position are blended by a greater amount than the color values for a data point that is at a greater z-depth from the render position.

Figure 4:
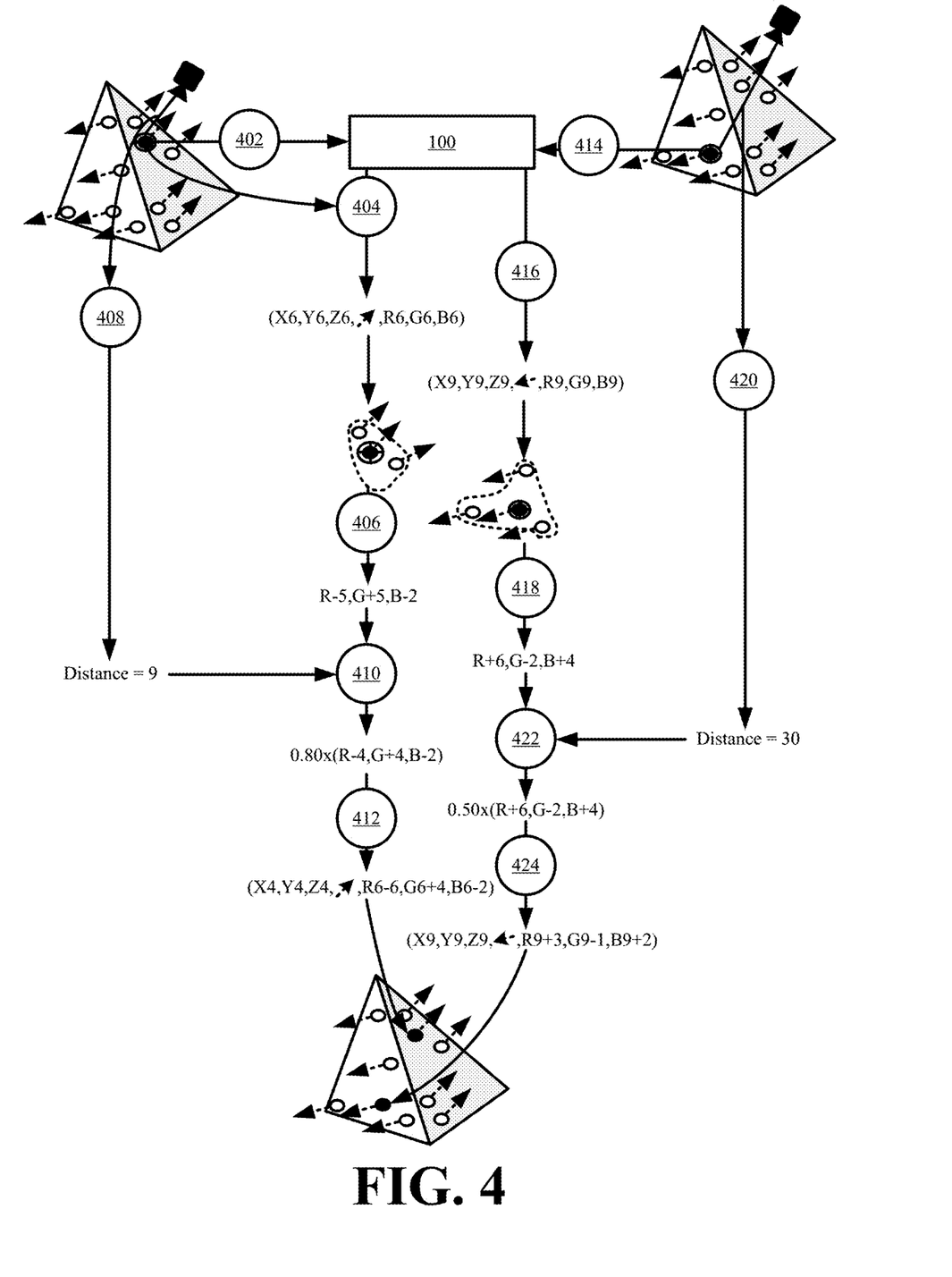
FIG. 4 illustrates an example of modifying a 3D edit based on the 3D positions of the 3D image data relative to a render position in accordance with some embodiments presented herein.

FIG. 4 illustrates an example of modifying a 3D edit based on the 3D positions of the 3D image data relative to a render position in accordance with some embodiments presented herein. 3D editing system 100 detects (at 402) a first activation of the 3D edit that is applied to a first point cloud point.

3D editing system 100 obtains (at 404) the positional and non-positional elements of the first point. 3D editing system 100 determines a first set of points that are a threshold distance from the first point, and computes (at 406) a first adjustment to apply to the first point using the non-positional elements of a first subset of the first set of points that are part of the same side of a surface edge, the same surface, and/or the same object as the first point. Specifically, 3D editing system 100 computes (at 406) the first adjustment based on the distance between each of the first subset of points and the first point and/or the degree with which the surface normal of each of the first subset of points is aligned with the surface normal of the first point.

3D editing system 100 determines (at 408) that the first point is a first distance from the render position. The render position is defined by placing a virtual camera in the 3D space of the point cloud, and defining the field-of-view based on the position and orientation of the virtual camera.

3D editing system 100 adjusts (at 410) the first adjustment based on the first distance of the first point from the render position. In some embodiments, 3D editing system 100 is configured to lower or reduce the impact that different 3D edits or adjustments have on the point cloud points that are at increasing depths or z-planes from the render position. For instance, 3D editing system 100 configures the first adjustment to apply with a 80% strength, opacity, intensity, or effect based on the first distance separating the first point from the render position being a small value and the first point being in the foreground of the field-of-view. 3D editing system 100 edits (at 412) the first point according to the first adjustment modified based on the first distance between the first point and the render position.

3D editing system 100 detects (at 414) a second activation of the 3D edit that is applied to a second point that is positioned in the background of the field-of-view relative to the first point. 3D editing system 100 obtains (at 416) the positional and non-positional elements of the second point.

3D editing system 100 determines a second set of points that are the threshold distance from the second point, and computes (at 418) a second adjustment to apply to the second point based on the non-positional elements of a second subset of the second set of points, the distance between each of the second subset of points and the second point, and/or the degree with which the surface normal of each of the second subset of points is aligned with the surface normal of the first point.

3D editing system 100 determines (at 420) that the second point is a second distance from the render position, and adjusts (at 422) the second adjustment based on the second distance of the second point from the render position. Specifically, 3D editing system 100 reduces the second adjustment more than the first adjustment to reduce the impact of the second adjustment on the more distant and less visible second point. 3D editing system 100 edits (at 424) the second point according to the second adjustment modified based on the second distance between the second point and the render position. Accordingly, 3D editing system 100 changes the blending, smudging, or other 3D effect that is applied to the 3D image data the farther the 3D image data is from the render position.

In some embodiments, 3D editing system 100 provides a GUI with which users may customize or tune settings of each attribute adjustment. The settings may control the degree by which an attribute adjustment is applied to selected 3D image data based on different depths or distances separating neighboring 3D image data and the selected 3D image data, differing surface normals between the neighboring 3D image data and the selected 3D image data, and/or different depths or distances separating the selected 3D image data from the render position. For instance, the setting may be used to the opacity, hardness, intensity, feathering, and/or other properties with which the attribute adjustment is applied to the selected 3D image data.

Figure 5:
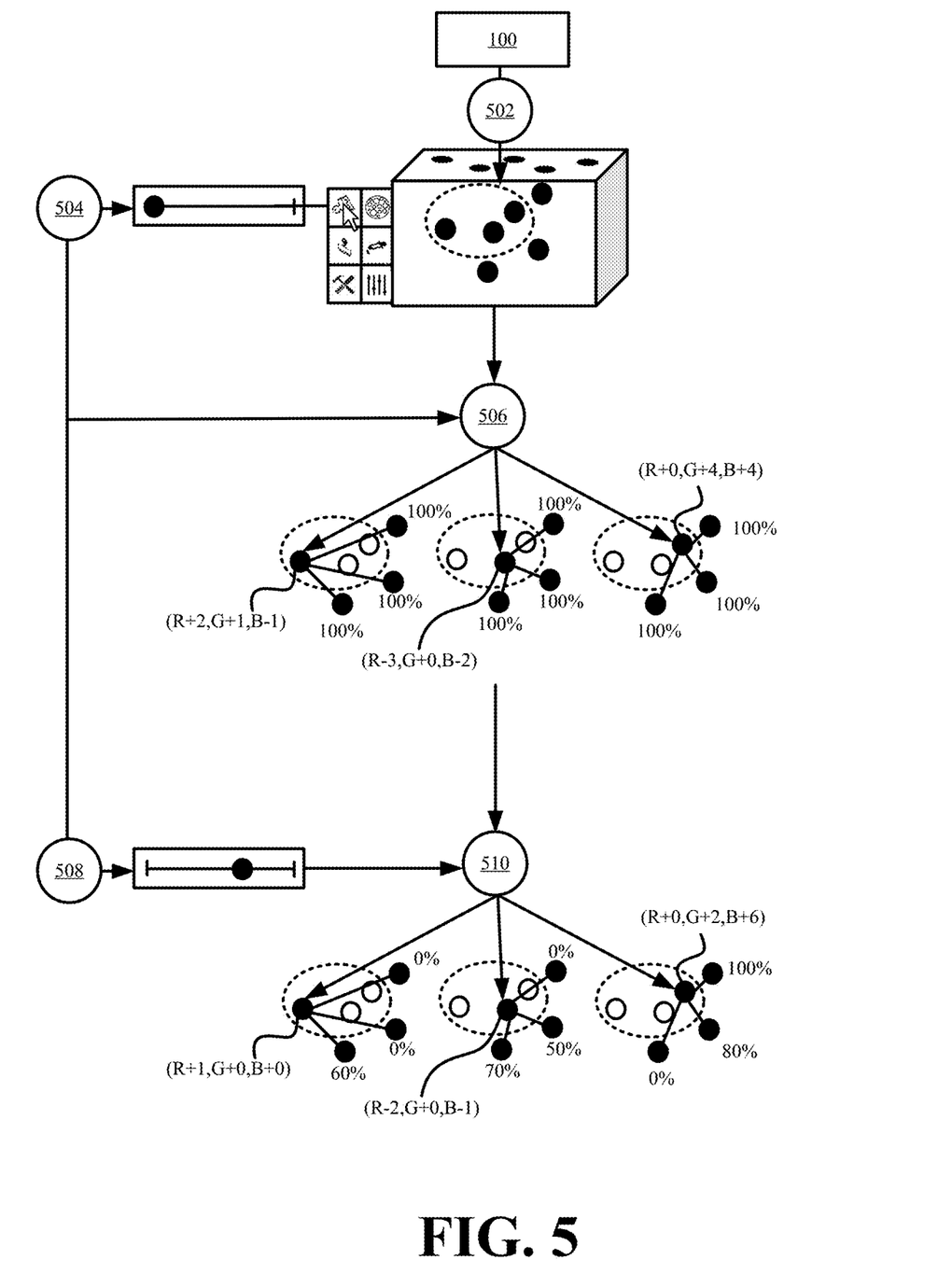
FIG. 5 illustrates an example of customizing the effect that neighboring 3D image data have on selected 3D image data for an activated attribute adjustment in accordance with some embodiments presented herein.

FIG. 5 illustrates an example of customizing the effect that neighboring 3D image data have on selected 3D image data for an activated attribute adjustment in accordance with some embodiments presented herein. 3D editing system 100 selects (at 502) a first set of points, and activates (at 504) a 3D color blending effect with a first feathering setting that is configured in response to user input.

3D editing system 100 computes (at 506) a blending adjustment for each point of the first set of points based on the difference in color values between a second set of points and the color values of each point in the first set of points as adjusted by the first feathering setting. The second set of points are automatically selected for the 3D color blending effect based on the second set of points being a threshold distance from the first set of points and having surface normals that are aligned with the surface normals of the first set of points. The first feathering setting configures no feathering adjustment for the 3D color blending effect. Accordingly, each point of the second set of point has an equal impact on the blending adjustment that is computed (at 506) for each point in the first set of point because of the first feathering setting resulting in no feathered application of the 3D color blending effect.

3D editing system 100 detects (at 508) that the first feathering setting is changed to a second feathering setting. In response, 3D editing system 100 modifies (at 510) the blending adjustment for each point of the first set of points. Specifically, as the feathering setting is increased, 3D editing system 100 lessens the blending impact that the color values of a more distant point from the second set of points have on the color values of a point in the first set of points.

Figure 6:
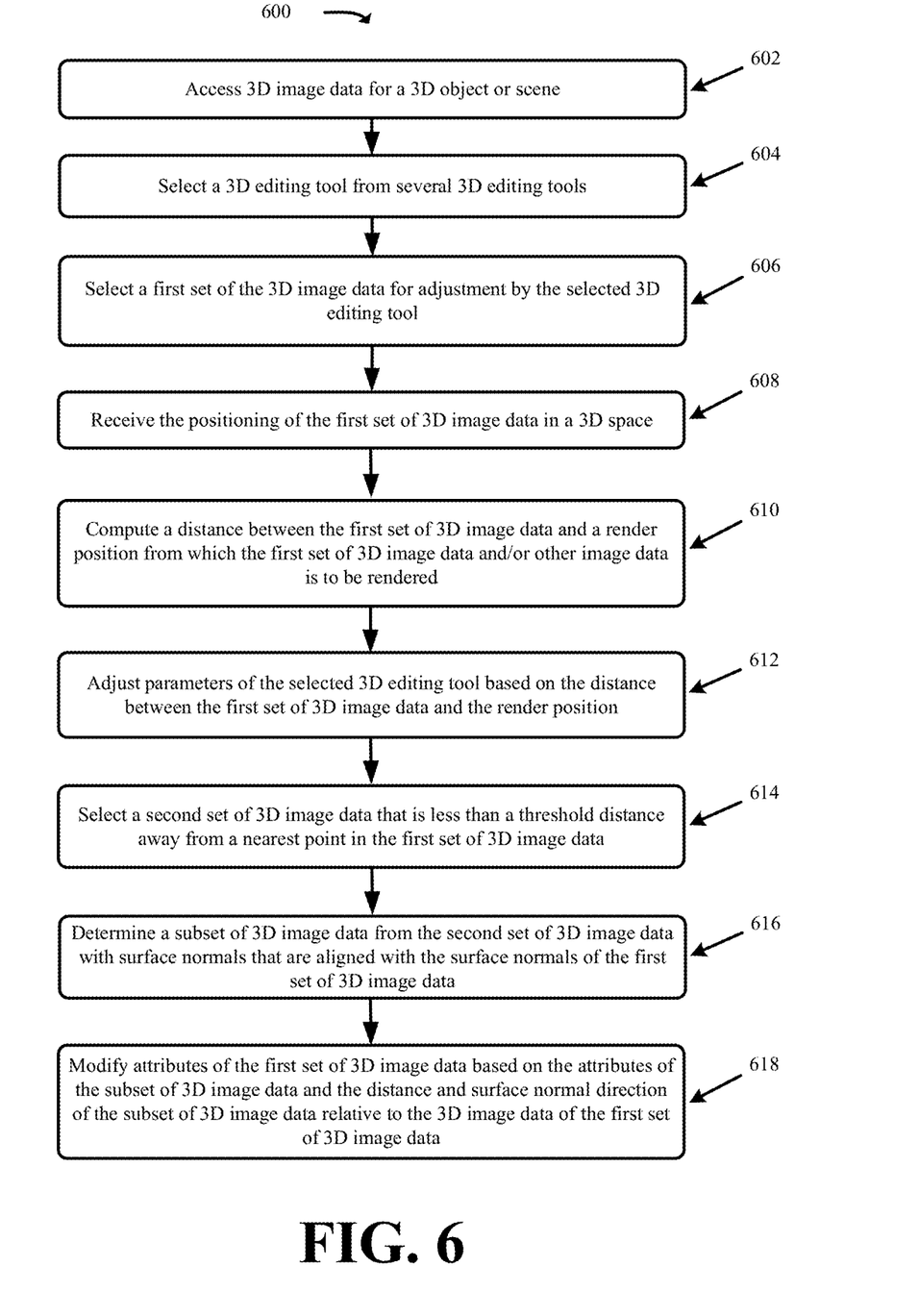
FIG. 6 presents a process for selectively editing attributes of 3D image data based on the relative positioning of the 3D image data and surrounding 3D image data in accordance with some embodiments presented herein.

FIG. 6 presents a process 600 for selectively editing attributes of 3D image data based on the relative positioning of the 3D image data and surrounding 3D image data in accordance with some embodiments presented herein. Process 600 is implemented by 3D editing system 100.

3D editing system 100 includes one or more devices or machines with processing (e.g., hardware processors), memory, storage, network, and/or other hardware resources that are used to render, interact, edit, and/or otherwise process 3D image data of different 3D image formats. 3D editing system 100 supports the rendering, interacting, editing, and/or processing of point clouds with data points distributed in a 3D space, 3D models constructed with connected sets of meshes or polygons, and/or other 3D representations formed by other connected primitives or 3D constructs.

Process 600 includes accessing (at 602) 3D image data for a 3D object or scene. Accessing (at 602) the 3D image data may include opening a file that encodes the 3D image data in response to a user request, receiving the 3D image data from one or more devices that generate the 3D image data (e.g., a scanner or 3D camera), or receiving the 3D image data over a data network. The 3D image data includes points, meshes, polygons, and/or other constructs or primitives that are distributed within a 3D space to form one or more 3D objects.

Process 600 includes selecting (at 604) a 3D editing tool from several 3D editing tools available within a GUI. For instance, the GUI may include icons, menus, or other selectable or interactive elements for selecting (at 604) amongst the 3D editing tools. The available 3D editing tools may include tools for blending, smudging, painting (e.g., replacing color), feathering, smoothing, spot healing (e.g., blemish removal), and/or performing other adjustments to the non-positional elements of selected 3D image data based on the 3D image data of surrounding or unselected 3D image data for the same surface or object.

Process 600 includes selecting (at 606) a first set of the 3D image data for adjustment by the selected (at 604) 3D editing tool. In some embodiments, the selection (at 606) of the first set of 3D image data is made using a lasso tool, different marquee selection tools (e.g., rectangular selection tool, ellipse selection tool, etc.), different volumetric selection tools (e.g., cubic, spherical, and/or other volumetric shapes), or via a freeform selection of the first set of 3D image data, and by activating the selected (at 604) 3D editing tool once the selection (at 606) of the first set of 3D image data is complete. In some other embodiments, the selection (at 606) of the first set of 3D image data is made by activating the selected (at 604) 3D editing tool over the first set of 3D image data. For instance, the user uses a mouse, trackpad, hand gestures, or other inputs to move a cursor or editing tool icon to the first set of 3D image data, and presses a button or performs another action to activate the selected (at 604) 3D editing tool and to move the 3D editing tool over or across the first set of 3D image data in order to select (at 606) the first set of the 3D image data. In still some other embodiments, the selection (at 606) is made programmatically. For instance, a user may enter a range of coordinates to specify the region within the point cloud to select, or may enter a range of color values or other non-positional element values to specify attributes for the selected (at 606) first set of 3D image data.

Process 600 includes retrieving (at 608) the positioning of the first set of 3D image data in a 3D space of the 3D image. 3D editing system 100 retrieves (at 608) the positioning by reading the positional elements defined for the first set of 3D image data.

Process 600 includes computing (at 610) a distance between the first set of 3D image data and a render position from which the first set of 3D image data and/or other image data is to be rendered. Specifically, process 600 determines the z-position delta or depth separating the first set of 3D image data and a camera position (e.g., the render position) within the 3D space.

Process 600 include adjusting (at 612) one or more parameters of the selected (at 604) 3D editing tool based on the distance between the first set of 3D image data and the render position. For instance, 3D editing system 100 automatically decreases the strength or intensity of the selected (at 604) 3D editing tool as the distance between the first set of 3D image data and the render position increases. Decreasing the strength or intensity may include decreasing the amount or percentage by which the first set of 3D image data is affected by the selected (at 604) 3D editing tool.

Process 600 includes selecting (at 614) a second set of 3D image data that less than a threshold distance away from a nearest point in the first set of 3D image data. Selecting (at 614) the second set of 3D image data includes analyzing the positional elements of the 3D image data surrounding the first set of 3D image data, computing the distance between the surrounding 3D image data and the first set of 3D image data, and determining the second set of 3D image that is the threshold distance from the first set of 3D image data. In some embodiments, the threshold distance is set based on the 3D editing tool that is selected (at 604) and/or configurable parameters associated with the selected (at 604) 3D editing tool. For instance, a first threshold distance may be specified for a 3D blending tool having a first brush size, and a second threshold distance may be specified for the 3D blending tool having a second brush size. The second set of 3D image data may include image data is initially not part of the first set of 3D image data, but that may become part of the first set of 3D image data as the user interacts with the selected (at 604) 3D editing tool.

Process 600 includes determining (at 616) a subset of 3D image data from the second set of 3D image data with surface normals that are aligned with the surface normals of the first set of 3D image data. Determining (at 616) the subset of 3D image data includes removing or excluding the 3D image data from the second set of 3D image data that is directed or positioned on different edges, surfaces, or objects than the first set of 3D image data. In some embodiments, 3D editing system 100 determines that 3D image data from the second set of 3D image data is on the same surface or part of the same continuous surfaces as the first set of 3D image data in response to the differences in the surface normal direction or angle between the 3D image data in the second set of 3D image data and the first set of 3D image data being less than a threshold (e.g., 90 degrees).

Process 600 includes modifying (at 618) the non-positional elements defining the attributes of the first set of 3D image data based on the non-positional elements defining the attributes of the subset of 3D image data and the distance and surface normal direction of the subset of 3D image data relative to the 3D image data of the first set of 3D image data. Specifically, 3D editing system 100 lessens the impact or contribution that the non-positional elements of the neighboring 3D image data from the subset of 3D image data have on the non-positional elements of the first set of 3D image data the farther the neighboring 3D image data is from the first set of 3D image data.

In some embodiments, the attribute modification (at 618) is adjusted based on settings associated with the selected (at 604) 3D editing tool. For instance, the settings may change the hardness, feathering, and/or other properties with which the effect of the selected (at 604) 3D editing tool is applied to the first set of 3D image data. Specifically, the settings may change the computation or calculation of the impact that the distance and surface normal direction of the subset of 3D image data have with respect to the blending, smudging, or other editing of the first set of image data.

In any case, 3D editing system 100 defines the attribute modification for each particular instance of 3D image data in the first set of 3D image data based on the parameters adjusted (at 612) according to the distance between the first set of 3D image data and the render position, the distance between the particular instance of the 3D image data and the subset of 3D image data, the alignment between the surface normal of the particular instance of the 3D image data and the surface normals of the subset of 3D image data, and the defined values for the non-positional values of the subset of 3D image data.

In some embodiments, 3D editing system 100 leverages the 3D positional data to implement a 3D healing brush or 3D blemish removal tool. The 3D healing brush accurately replaces the visual characteristics of a blemish with the visual characteristics from neighboring points about a common and/or continuous surface that are identified based on the distance and surface normals of the neighboring points to the 3D position and surface normals of the points representing the blemish.

Figure 7:
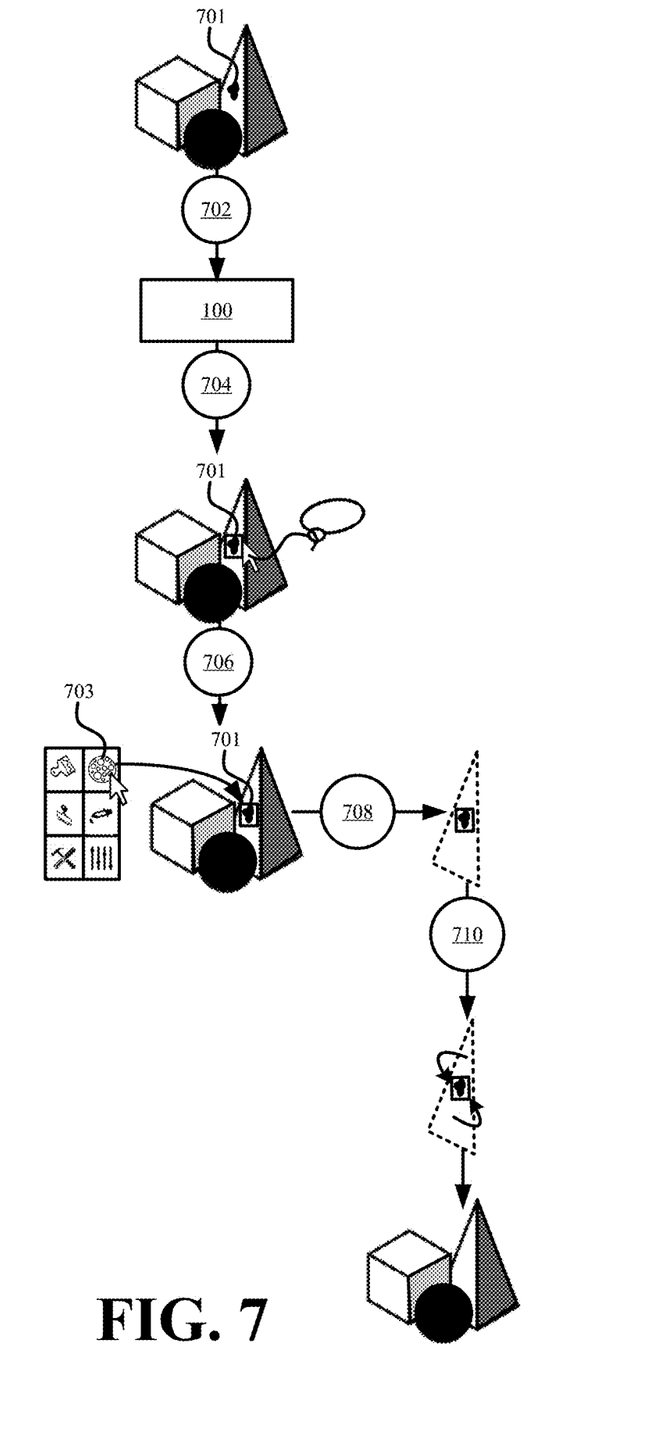
FIG. 7 illustrates an example of a 3D blemish removal tool in accordance with some embodiments presented herein.

FIG. 7 illustrates an example of the 3D blemish removal tool in accordance with some embodiments presented herein. 3D editing system 100 receives (at 702) a 3D image with blemish 701. Blemish 701 may be caused by improper 3D scanning of a 3D object, improper lighting that prevents an accurate scan of the 3D object where blemish 701 occurs, and/or blemish 701 being present on the captured 3D object.

3D editing system 100 selects (at 704) a first set of 3D image data (e.g., point cloud points, meshes, polygons, etc.) that represent the volume or region of the 3D image with blemish 701 in response to user input. The selection (at 704) may be imperfect in that it includes other 3D image data that is not associated with blemish 701.

3D editing system 100 activates (at 706) 3D blemish removal tool 703 in response to the user input. For instance, once the first set of 3D image data with blemish 701 is selected, the user may perform an action that implements the 3D blemish removal function associated with the 3D blemish removal tool 703.

In response to activation (at 706) of the 3D blemish removal tool, 3D editing system 100 obtains the positional elements of the first set of 3D image data, and selects (at 708) a second set of 3D image data that surrounds the first set of 3D image data and that is a threshold distance from the from the first set of 3D image data. For instance, 3D editing system 100 may select (at 708) the second set of 3D image data to have no more than a specified horizontal offset (e.g., x-coordinate delta), vertical offset (e.g., y-coordinate delta), and depth offset (e.g., z-coordinate delta) from the first set of 3D image data. 3D editing system 100 refines the selection (at 708) of the second set of 3D image based on the 3D image data surface normals to include 3D image data that is part of the same continuous surface or surface side as the first set of 3D image, and to exclude 3D image data that makes up a different surface or surface side than the first set of 3D image data.

3D editing system 100 replaces (at 710) the values for the non-positional elements of the first set of 3D image data with the values for the non-positional elements of the second set of 3D image data to remove blemish 701. In some embodiments, 3D editing system 100 analyzes the non-positional elements of the second set of 3D image data to determine a pattern that is extended or continued to the first set of 3D image data.

Figure 8:
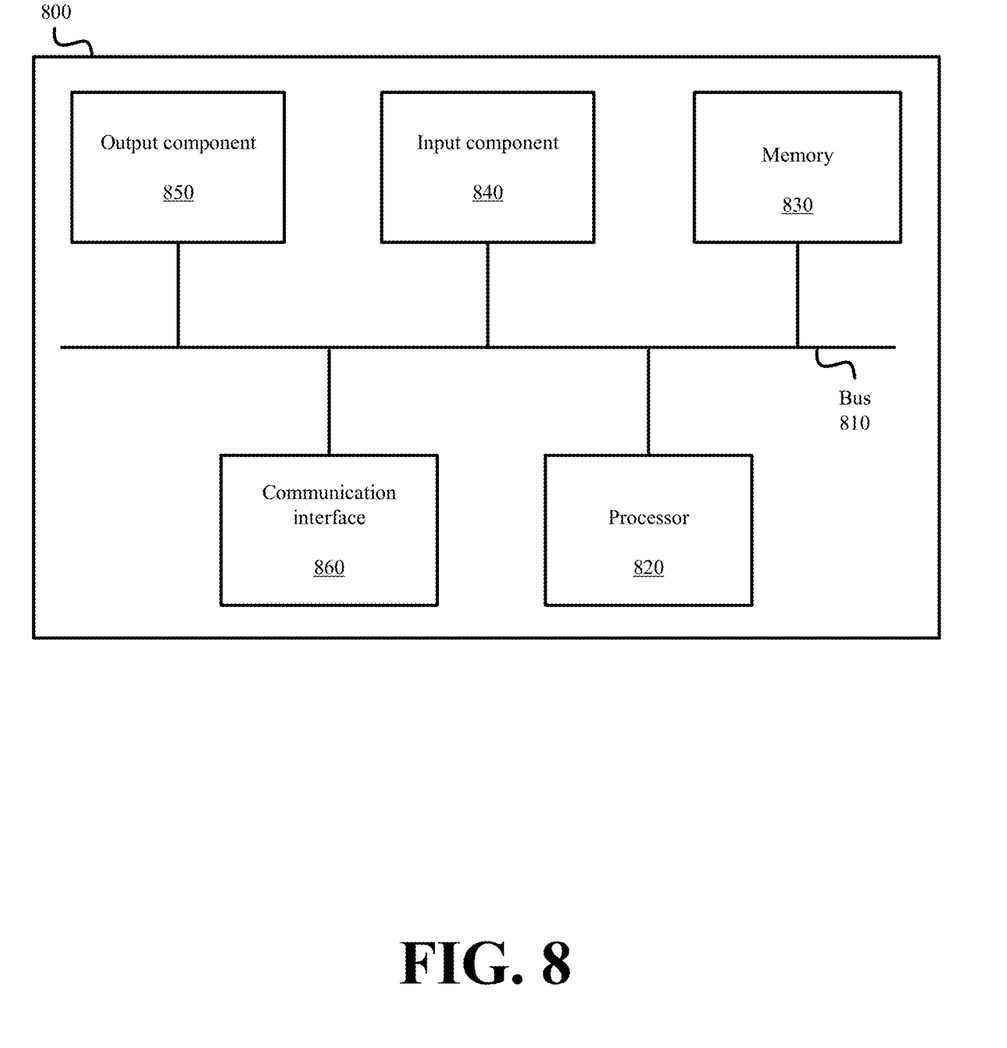
FIG. 8 illustrates example components of one or more devices, according to one or more embodiments described herein.

FIG. 8 is a diagram of example components of device 800. Device 800 may be used to implement one or more of the devices or systems described above (e.g., 3D editing system 100). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like.

Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a three-dimensional ("3D") image comprising a plurality of 3D image data that is distributed across a 3D space, each 3D image data instance from the plurality of 3D image data being defined with a set of positional elements that specify a position of that 3D image data instance in the 3D space, and a set of non-positional elements that specify visual characteristics of that 3D image data instance;
   applying an editing tool to a first set of 3D image data from the plurality of 3D image data;
   selecting a second set of 3D image data from the plurality of 3D image data in response to applying the editing tool to the first set of 3D image data, wherein the set of positional elements of the second set of 3D image data define positions that are less than a threshold distance from positions of the first set of 3D image data and that are part of a plurality of surfaces, and wherein the first set of 3D image data forms a particular surface of the plurality of surfaces in the 3D space of the 3D image;
   filtering the second set of 3D image data to a subset of 3D image data from the second set of 3D image data that forms part of the particular surface with the first set of 3D image data, wherein said filtering comprises excluding, from the subset of 3D image data, other 3D image data from the second set of 3D image data that forms part of surfaces other than the particular surface; and
   adjusting the set of non-positional elements of the first set of 3D image data based on the set of non-positional elements of the subset of 3D image data that is filtered to include 3D image data that is not in the first set of 3D image data and that forms part of the particular surface with the first set of 3D image data.

2. The method of claim 1, wherein the set of positional elements comprises a surface normal for an angle or direction of each 3D image data instance.

3. The method of claim 2, wherein filtering the second set of 3D image data comprises:
   determining that the surface normal of each 3D image data instance from the subset of 3D image data is aligned with the surface normal of at least one 3D image data instance from the first set of 3D image data, wherein the subset of 3D image data is a first subset of 3D image data from the second set of 3D image data; and
   excluding a second subset of the second set of 3D image data from the first subset of 3D image data in response to the surface normal of each 3D image data instance from the second subset of the second set of 3D image data not being aligned with the surface normal of at least one 3D image data instance from the first set of 3D image data.

4. The method of claim 2, wherein filtering the second set of 3D image data comprises:
   determining that the subset of 3D image data forms part of the particular surface with the first set of 3D image data based on the surface normal of each 3D image data instance from the subset of 3D image data differing by less than a threshold from the surface normal of at least one 3D image data instance from the first set of 3D image data.

5. The method of claim 1, wherein adjusting the set of non-positional elements comprises:
   blending color values of the first set of 3D image data with color values of the subset of 3D image data.

6. The method of claim 1, wherein adjusting the set of non-positional elements comprises:
   replacing a blemish on the particular surface represented by the first set of 3D image data with an unblemished representation of the particular surface represented by the subset of 3D image data.

7. The method of claim 1, wherein filtering the second set of 3D image data comprises:
   detecting that the subset of 3D image data is on a same side of an edge of the particular surface as the first set of 3D image data based on the set of positional elements of the subset of 3D image data and the first set of 3D image data, wherein the subset of 3D image data is a first subset of 3D image data from the second set of 3D image data; and excluding a second subset of the second set of 3D image data from the first subset of 3D image data based on the set of positional elements of the second subset of 3D image data forming part of the particular surface on a different side of the edge than the first set of 3D image data.

8. The method of claim 1, wherein adjusting the set of non-positional elements of the first set of 3D image data comprises:
calculating an impact that the set of non-positional elements of each 3D image data instance from the subset of 3D image data has on the set of non-positional elements of each 3D image data instance from the first set of 3D image data based on a distance between the 3D image data instance from the subset of 3D image data and the 3D image data instance from the first set of 3D image data.

9. The method of claim 1, wherein adjusting the set of non-positional elements of the first set of 3D image data comprises:
modifying an amount that the set of non-positional elements of each 3D image data instance from the first set of 3D image data is affected by the set of non-positional elements of each 3D image data instance from the subset of 3D image data based on a difference in values defined for the set of positional elements of the 3D image data instance from the subset of 3D image data and the set of positional elements of the 3D image data instance from the first set of 3D image data.

10. The method of claim 1 further comprising:
computing one or more adjustments to apply to the set of non-positional elements of the first set of 3D image data based on the set of non-positional elements of the subset of 3D image data;
determining a distance between the first set of 3D image data and a render position, wherein the render position is a position in the 3D space from which the first set of 3D image data is rendered; and
modifying the one or more adjustments based on the distance between the first set of 3D image data and the render position.

11. The method of claim 10, wherein computing the one or more adjustments comprises:
determining a distance between a first 3D image data instance from the subset of 3D image data and a second 3D image data instance from the first set of 3D image data; and
defining a particular adjustment to the set of non-positional elements of the second 3D image data instance based on the set of non-positional elements of the first 3D image data instance and the distance between the first 3D image data instance and the second 3D image data instance.

12. The method of claim 11, wherein computing the one or more adjustments further comprises:
determining a difference between a surface normal of the first 3D image data instance and a surface normal of the second 3D image data instance; and
modifying the particular adjustment based on the difference between the surface normal.

13. The method of claim 10, wherein computing the one or more adjustments comprises:
averaging color values defined for the set of non-positional elements of the subset of 3D image data.

14. The method of claim 1, wherein the set of positional elements comprises x, y, and z positional coordinates, and wherein the set of non-positional elements comprises a plurality of different color values.

15. The method of claim 14, wherein the plurality of 3D image data comprises a plurality of points of a point cloud that are non-uniformly distributed across the 3D space.

16. The method of claim 14, wherein the plurality of 3D image data comprises a connected set of meshes or polygons that form a 3D object.

17. A system comprising:
one or more hardware processors configured to:
receive a three-dimensional ("3D") image comprising a plurality of 3D image data that is distributed across a 3D space, each 3D image data instance from the plurality of 3D image data being defined with a set of positional elements that specify a position of that 3D image data instance in the 3D space, and a set of non-positional elements that specify visual characteristics of that 3D image data instance;
apply an editing tool to a first set of 3D image data from the plurality of 3D image data;
select a second set of 3D image data from the plurality of 3D image data in response to applying the editing tool to the first set of 3D image data, wherein the set of positional elements of the second set of 3D image data define positions that are less than a threshold distance from positions of the first set of 3D image data and that are part of a plurality of surfaces, and wherein the first set of 3D image data forms a particular surface of the plurality of surfaces in the 3D space of the 3D image;
filter the second set of 3D image data to a subset of 3D image data from the second set of 3D image data that forms part of the particular surface with the first set of 3D image data, wherein said filtering comprises excluding, from the subset of 3D image data, other 3D image data from the second set of 3D image data that forms part of surfaces other than the particular surface; and
adjust the set of non-positional elements of the first set of 3D image data based on the set of non-positional elements of the subset of 3D image data that is filtered to include 3D image data that is not in the first set of 3D image data and that forms part of the particular surface with the first set of 3D image data.

18. The system of claim 17, wherein the set of positional elements comprises a surface normal for an angle or direction of each 3D image data instance.

19. The system of claim 18, wherein filtering the second set of 3D image data comprises:
determining that the surface normal of each 3D image data instance from the subset of 3D image data is aligned with the surface normal of at least one 3D image data instance from the first set of 3D image data, wherein the subset of 3D image data is a first subset of 3D image data from the second set of 3D image data; and
excluding a second subset of the second set of 3D image data from the first subset of 3D image data in response to the surface normal of each 3D image data instance from the second subset of the second set of 3D image data not being aligned with the surface normal of at least one 3D image data instance from the first set of 3D image data.

20. A non-transitory computer-readable medium storing program instructions that, when executed by one or more hardware processors of a three-dimensional ("3D") editing system, cause the 3D editing system to perform operations comprising:

receiving a three-dimensional ("3D") image comprising a plurality of 3D image data that is distributed across a 3D space, each 3D image data instance from the plurality of 3D image data being defined with a set of positional elements that specify a position of that 3D image data instance in the 3D space, and a set of non-positional elements that specify visual characteristics of that 3D image data instance;

applying an editing tool to a first set of 3D image data from the plurality of 3D image data;

selecting a second set of 3D image data from the plurality of 3D image data in response to applying the editing tool to the first set of 3D image data, wherein the set of positional elements of the second set of 3D image data define positions that are less than a threshold distance from positions of the first set of 3D image data and that are part of a plurality of surfaces, and wherein the first set of 3D image data forms a particular surface of the plurality of surfaces in the 3D space of the 3D image;

filtering the second set of 3D image data to a subset of 3D image data from the second set of 3D image data that forms part of the particular surface with the first set of 3D image data, wherein said filtering comprises excluding, from the subset of 3D image data, other 3D image data from the second set of 3D image data that forms part of surfaces other than the particular surface; and adjusting the set of non-positional elements of the first set of 3D image data based on the set of non-positional elements of the subset of 3D image data that is filtered to include 3D image data that is not in the first set of 3D image data and that forms part of the particular surface with the first set of 3D image data.

* * * * *